March 17, 1970     E. S. GWATHMEY     3,500,685
AIRCRAFT ANGLE OF ATTACK AND SIDESLIP INDICATORS
Filed Aug. 22, 1968
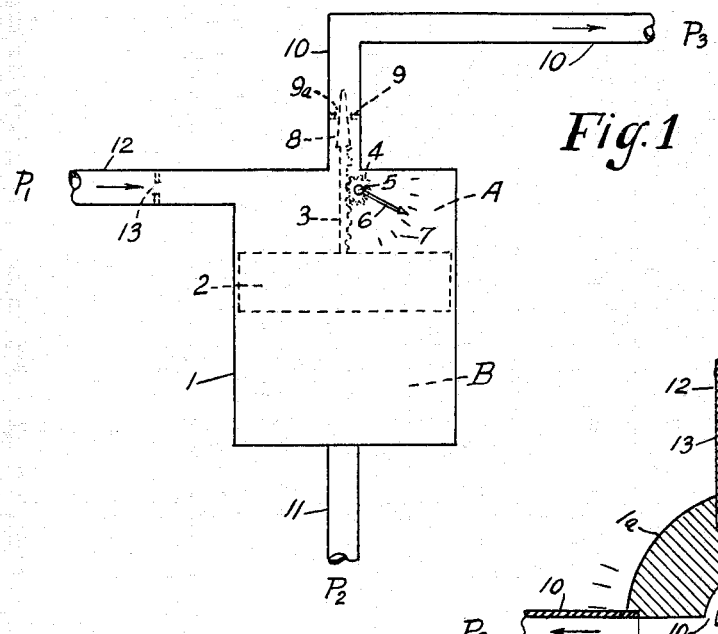
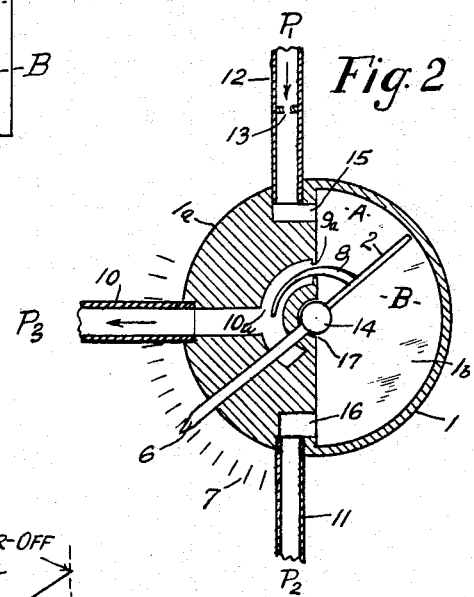
$P_1 > P_2 > P_3$
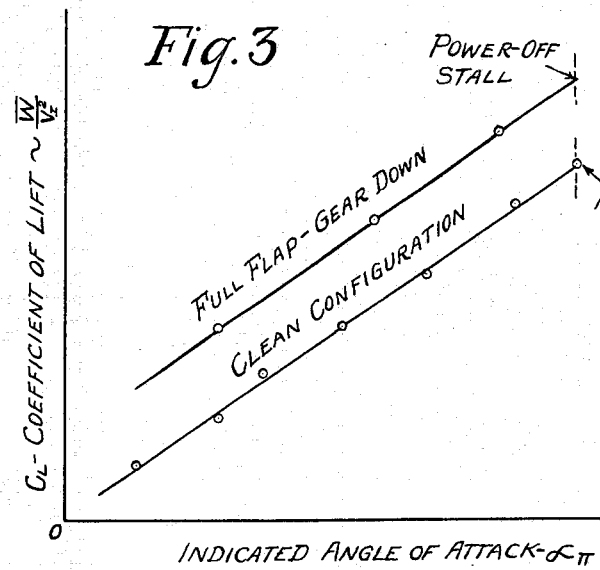
INVENTOR
Edward S. Gwathmey

United States Patent Office 3,500,685
Patented Mar. 17, 1970

3,500,685
AIRCRAFT ANGLE OF ATTACK AND SIDESLIP INDICATORS
Edward S. Gwathmey, Charlottesville, Va., assignor to Teledyne, Inc., Hawthorne, Calif.
Filed Aug. 22, 1968, Ser. No. 754,697
Int. Cl. G01c *21/00*
U.S. Cl. 73—180         8 Claims

ABSTRACT OF THE DISCLOSURE

This instrument determines angle of attack or sideslip by means of air pressures taken at three selected points on the aircraft. These pressures are converted to fluid flows by applying them to capillaries, orifices, or the like and means are provided to equalize the flows until a balanced condition of a movable element such as a piston or vane is achieved. A pointer attached to the movable element will then indicate the angle of attack or sideslip, relative to a scale.

---

This invention relates to aircraft instruments and instrument systems and especially to an instrument system for indicating angle of attack or sideslip of the vehicle.

It is an object to provide an aircraft instrument which is of relatively simple construction and which will give reliable indications or determinations of angle of attack or sideslip of the aircraft in flight.

Another object is to provide an angle of attack instrument of relatively simple construction and especially applicable for aircraft of low performance or moderate speeds.

A further object is the provision of an instrument for determining angle of attack or sideslip of an aircraft by means of three air pressures taken from three different points on the aircraft.

An additional object is to provide an instrument for determining angle of attack or sideslip of an aircraft by means of air pressures taken at three selected points on the aircraft and balancing these pressures automatically and employing an element responsive to a balanced pressure condition to indicate angle of attack or sideslip.

Other objects will be evident in the following description.

In the drawings:
FIGURE 1 is a schematic representation of my angle of attack indicating system.
FIGURE 2 is a part sectional face view of a practical embodiment of my invention.
FIGURE 3 is a graph showing "Indicated Angle of Attack" vs. "Coefficient of Lift" as a result of tests made on my invention in flight.

The arrangement of the pressure channels is shown in FIG. 1. The pressure differences may be converted to fluid flows by applying them to capillaries, orifices, and the like and providing means to vary these elements to equalize the flows. Variable orifices can be realized practically and, as will be shown, can be designed to provide desirable dynamic response for angle of attack measurement or indication. The variable orifice method of angle of attack measurement will now be described for the incompressible fluid case.

In the following detailed description and mathematical expressions the following notations apply:

$P_1$, $P_2$, and $P_3$ represent the three absolute pressures at the three selected pressure points.

S represents the reference pressure which will be considered to be free stream static pressure.

$q$ is the sol-called dynamic pressure=$\frac{1}{2}\rho v^2$ where $\rho$= density of the air and $v$=relative velocity of the air and the aircraft. $\psi_1$, $\psi_2$, and $\psi_3$ are the pressure coefficients of the respective three pressure points. According to aerodynamic theory these coefficients are functions of angle of attack only for incompressible flow and of angle of attack and Mach number (M) for compressible flow.
$\alpha$=angle of attack.

To illustrate the principle described in the abstract, for the angle of attack case, the three absolute pressures are expressed as follows:

$P_1 = S + \psi_1 q$
$P_2 = S + \psi_2 q$
$P_3 = S + \psi_3 q$ and assume that $P_1 > P_2 > P_3$.

Forming the ratio of pressure differences the following function is obtained:

$$F(\alpha, M) = \frac{P_1 - P_2}{P_2 - P_3} = \frac{\psi_1 - \psi_2}{\psi_2 - \psi_3}$$

In FIGURE 1, cylinder 1 is assumed to have its axis horizontally aligned. Piston 2 in the cylinder is of light weight and is horizontally movable in the cylinder. Piston rod 3 is fixed to the piston and comprises a rack the teeth of which are meshed with pinion 4 which is fastened to shaft 5 which is suitable mounted for rotation through an angle. Pointer 6, fastened to shaft 5, is movable over arcuate scale 7 which may be calibrated in angle of attack or the like. A suitable glass or other transparent plate or member is used to cover an opening in the cylinder wall and to seal the opening against air leakage, at the same time allowing the pointer 6 and scale 7 to be seen. The scale may be placed on a sheet of material within the cylinder or within an extension therefrom. Tapered element 8 is fastened to or is integral with rack 3 and is movable through an aperture in wall 9 to form, in effect, a variable orifice $9_a$ in tube 10 having pressure $P_3$ at the air-discharge end thereof. Tube 10 is connected with chamber A of the cylinder on one side of piston 2.

Tube 11 has an end port pressure $P_2$ and is connected with chamber B of cylinder 1. Tube 12 has restricted orifice 13 and is connected with chamber B of cylinder 1. Tube 12 has restricted orifice 13 and is connected with chamber A of the cylinder. The entrant air pressure of tube 12 is $P_1$. It will be observed that when the piston moves in a direction to make chamber A smaller the tapered element 8 moves through the aperture of wall 9 in a direction to reduce the net effective area of the orifice in element 9, and when the piston moves in a direction to make chamber A larger the net effective area of the orifice in element 9 is enlarged. If desired a variable orifice 13 can also be linked to piston 2, the effective area of the orifice to be varied in accordance with movements of the piston.

Due to flow restricting orifices $9_a$ and 13 the pressure Q in chamber A of the cylinder will be an intermediate pressure between pressure $P_1$ at the entrance of tube 12 and discharge pressure $P_3$ at the air discharge end of tube 10. Variable orifice system comprising elements 3, 8, and 9 can vary widely in construction from that shown. FIGURE 1 is intended to illustrate the broad principles of the invention rather than specific structure.

If pressure Q in chamber A is greater than pressure $P_2$ in tube 11 and connected chamber B, a pressure differential will exist across piston 2, forcing it in a direction to increase the volume of chamber A and to increase the net effective area of orifice $9_a$; then pressure Q will be reduced. If friction is negligible equilibrium occurs only when pressure Q is equal to pressure $P_2$ and the flow through orifice 13 equals the flow through orifice $9_a$. If $a$ and $b$ are the effective areas of the restrictive orifices 13 and $9_a$, respectively, Bernoulli's equation gives:

$$\text{Flow} = a\sqrt{\frac{2(P_1-Q)}{\rho}} = b\sqrt{\frac{2(Q-P_3)}{\rho}}$$

But $Q = P_2$, hence the area ratio $$\frac{b}{a} = \sqrt{\frac{\Psi_1 - \Psi_2}{\Psi_2 - \Psi_3}} = f(\alpha) \text{ is a function of angle of attack}$$

The indicated angle of attack for any balanced position of piston 2 can be read on scale 7 in accordance with the relative position of pointer 6 which position is indicative of the position of the piston. It will be seen that the net area of orifice $9_a$ is automatically adusted by movement of piston 2 and connected element 8 until the pressures on both sides of piston 2 are equal.

If it is desired to maintain a fixed angle of attack the piston or element 3 can be mechanically or otherwise connected with the throttle, elevator, or other suitable control member of the aircraft automatically to hold the angle of atack within desired limits.

In FIGURE 2, which illustrates a practical form of the angle of attack or sideslip device or system, like parts are designated by like numerals as in FIGURE 1. In this modification of the invention the cylinder 1 is replaced by semi-cylindrical wall 1 which is integral with solid portion $1_a$. Piston 2 is replaced by vane 2 which is fastened to shaft 14 which is rotatable through an angle, in suitable bearings. Vane 2 is arranged to be swept around the inner curved surface of wall 1 in close proximity thereto and opposite edges of the vane are moved close to inner bottom surface $1_b$ and close to the inner upper surface of the cover, not shown. This cover is fastened to casing elements $1_a$ and 1 in any suitable manner such as by screws, clamps, adhesive, or other means.

The tapered orifice-controlling element 8 is curved in this case and is attached to vane 2. This element is movable through orifice $9_a$ connecting with curved channel $10_a$ in member $1_a$. This channel is connected with tube 10 fastened in a short bore in member $1_a$, and may be considered as a continuation of tube 10. Restrictive orifice 13 in tube 12 is provided and this tube is fastened in a bore in member $1_a$, being connected with channel 15 leading into chamber A on one side of vane 2. Tube 11 is fastened in a short bore in member $1_a$ and leads into bore 16 connected with chamber B which is dependent in volume on the position of vane 2. Shaft 14 carries pointer 6 which is arcuately movable relative to scale 7 marked on a plate or any suitable part of the device. This shaft is in close proximity to semi-cylindrically curved wall 17 of member $1_a$ to minimize leakage of air from chamber A to chamber B or vice versa. The tubes 10, 11, and 12 have ports at three respective points on the aircraft as previously described.

In operation, the aircraft is flown at a proper angle of attack, producing an initial pressure $P_1$ and a flow of air in tube 12 as indicated by the arrow. After passing through orifice 13 the air entering chamber A is at a pressure Q below $P_1$ and the air passing out of tube 10 is at a still lower pressure due to the restricted flow through variable orifice $9_a$. It is obvious that as vane 2 is rotated clockwise about the axis of shaft 14 the net effective area of orifice $9_a$ is increased and the pressure Q in chamber A accordingly decreases relative to pressure $P_1$. If the pressure Q in chamber A is greater than pressure $P_2$ there will be a pressure differential across the vane 2 which will be rotated clockwise until the movement of tapered element 8 is sufficient to enlarge the orifice $9_a$ until the pressure in chamber A drops until it is just equal to pressure $P_2$ in chamber B. The vane will then become stationary relative to casing 1 and pointer 6 will indicate the angle of attack on scale 7. Now if the angle of attack is increased the pressure $P_2$ in chamber B will be greater than the pressure Q in chamber A and vane 2 will be rotated counter clockwise until the element 8 restricts the effective area of orifice $9_a$ and causes a build-up of pressure in chamber A until it is equal to pressure $P_2$ in chamber B. The vane and pointer are stopped in the new pressure-balanced condition and the pointer then indicates a smaller angle of attack on scale 7.

RATIOMETER RESPONSE EQUATION

The response of the ratio meter will be calculated in a particular case. In actual practice it is expedient to choose total stream pressure for $P_1$ and a wake pressure not influenced by angle of attack for $P_3$, hence the three pressures may be designated as $$P = P_1 = S + q, \quad \psi_1 = 1$$
$$L = P_2 = S + \psi(\alpha)q, \quad \psi_2 = \psi$$
$$W = P_3 = S + Kq, \quad \psi_3 = K = \text{Constant} < 0.$$

Now let the position of the moving element 2 of the actuator in the drawings be represented by a non-dimensional variable $\phi$ and let D be the volume of fluid displaced by the element 2 for a unit change of $\phi$. The flow through the actuator is then $$D\dot{\phi} = -a\sqrt{\frac{2(P-Q)}{\rho}} + b\sqrt{\frac{2(Q-W)}{\rho}} \quad (1)$$

and if the moment of inertia associated with $\phi$ is J, then $$J\ddot{\phi} = (L-Q)D \quad (2)$$

Assuming that friction can be ignored, Q can be eliminated between Equations 1 and 2 and so the dynamical equation of the device can be obtained. In practical design, the inertia may be reduced to a negligible quantity so that Q is sensibly equal to L and then Equation 1 becomes simply $$D\dot{\phi} = bv\sqrt{\psi - K} - av\sqrt{1-\psi}$$

or $$\frac{D}{va}\dot{\phi} = \frac{b}{a}\sqrt{\psi - K} - \sqrt{1-\psi} \quad (3)$$

For equilibrium point, $\dot{\phi} = 0$, and $$\frac{b}{a} = \sqrt{\frac{1-\psi}{\psi - K}}$$

where $b/a$ is a function of $\phi$ only and the right hand surd is a function of $\alpha$ only.

If the equilibrium is perturbed by an incremental change of angle of attack $\Delta\alpha$, then the responsive equation is $$\frac{D}{va}\dot{\phi} = \sqrt{\psi - K}\frac{\partial}{\partial \psi}\left(\frac{b}{a}\right)\Delta\phi + \frac{1}{2}\left\{\frac{\frac{b}{a}}{\sqrt{\psi - K}} + \frac{1}{\sqrt{1-\psi}}\right\}\frac{\partial \psi}{\partial \alpha}\Delta\alpha$$

which can be rewritten $$T\dot{\phi} + \Delta\phi = \sigma\Delta\alpha \quad (4)$$

with $$T = -\frac{D}{va}\frac{1}{\sqrt{\psi - K}\frac{\partial}{\partial \psi}\left(\frac{b}{a}\right)}$$

and $$\sigma = -\frac{1}{2\sqrt{\psi - K}\frac{\partial}{\partial \phi}\left(\frac{b}{a}\right)}\left\{\frac{\frac{b}{a}}{\sqrt{\psi - K}} + \frac{1}{\sqrt{1-\psi}}\right\}\frac{\partial \psi}{\partial \alpha}$$

These expressions show that the gradient of the ratio of the valve areas i.e.

$$\frac{\partial}{\partial \phi}\left(\frac{b}{a}\right)$$

must be negative for stability. Sensitivity and smoothing of the output depend in this case only on the geometry of the orifices, the pressure coefficient $\psi$ and the true airspeed $v$. For light aircraft in unaccelerated flight, $v$ is an approximate function of angle of attack.

Inspection of pressure coefficients on the forward undersides of wings shows that it is possible to obtain very satisfactory combinations of T and $\sigma$ throughout the flight envelope of a typical low performance airplane.

The results of actual flight tests of my invention are shown by the curves of FIGURE 3 which were plotted from data obtained by flying an aircraft in level, straight flight at different indicated speeds $V_I$ and noting the displacement of piston rod 3 and connected valve element 8 relative to a reference, for each balanced condition of pressure responsive member 2. The power-off stalls were in decelerating level flight. These curves show a virtually straight line relationship between coefficient of lift and indicated angle of attack, for both a flap- and gear-down condition and for a clean configuration with flaps and landing gear fully retracted. These results of course are quite desirable and indicate that my invention fills a definite, practical need.

What I claim is:

1. In an aircraft instrument system for determining the direction of relative motion of the airstream with respect to the axes of said aircraft, a plurality of conduits for air at a plurality of locations on said aircraft, means responsive to difference of pressures in said conduits and connected therewith, variable orifice means in at least one of said conduits, means connecting said pressure difference responsive means with said variable orifice means to vary the effective orifice thereof in accordance with the degree of response of said pressure difference responsive means, means forming a restricted orifice in at least one other of said conduits, and means operatively connected with said pressure difference responsive means and varying in accordance with variations of said relative motion of said airstream.

2. The instrument system as described in claim 1, said system including three conduits for air at three different locations on said aircraft.

3. The instrument system as described in claim 2, said conduits conducting air at three different locations on said aircraft and producing air flow through two of said conduits to produce a net effective pressure applied to said pressure difference responsive means to cause response thereof in one sense, and the third said conduit conducting air to said pressure difference responsive means to cause response thereof in opposite sense.

4. The instrument as described in claim 3, said means connecting said pressure difference responsive means with said variable orifice means causing an increase in the ratio of the effective area of the variable orifice to the effective area of the restricted orifice when said net effective pressure is greater than the effective pressure in said third conduit.

5. The instrument system as described in claim 3, said means responsive to pressure difference being moved relative to the instrument until the net effective air pressure effectively balances the pressure of air passed through said third conduit.

6. The instrument system as described in claim 1, said pressure difference responsive means including an enclosure having a curved inner wall and vane means mounted for limited rotation adjacent said wall.

7. The instrument system as described in claim 1, said pressure difference responsive means including an enclosure having a curved inner wall, a shaft mounted for rotation, a vane carried by said shaft and movable adjacent said inner wall, a tapered element movable with said vane, said variable orifice being controlled by said tapered element situated therein.

8. The instrument system as described in claim 1, said pressure difference responsive means including an enclosure having a curved inner wall, a shaft mounted for rotation, vane means carried by said shaft and movable through a limited angle adjacent said inner wall, said vane dividing said enclosure into a first chamber and a second chamber, said conduits having a variable orifice and a restricted orifice being connected with said first chamber, a third conduit connected with said second chamber, and means movable with said vane for varying the effective area of said variable orifice.

References Cited

UNITED STATES PATENTS 2,176,807   10/1939   Wunsch _____ 73—180

DONALD O. WOODIEL, Primary Examiner